(12) United States Patent
Starkey

(10) Patent No.: US 6,256,881 B1
(45) Date of Patent: Jul. 10, 2001

(54) ELECTRICAL CONNECTION METHOD FOR MOLD COMPONENTS AND A PLASTIC INJECTION MOLDING PRESS

(76) Inventor: Glenn Starkey, 122 Ravine La., North Barrington, IL (US) 60010

( * ) Notice: Subject to any disclaimer, the term of this patent is extended or adjusted under 35 U.S.C. 154(b) by 0 days.

(21) Appl. No.: 09/427,536

(22) Filed: Oct. 26, 1999

Related U.S. Application Data

(62) Division of application No. 09/093,431, filed on Jun. 8, 1998, now Pat. No. 5,984,716.

(60) Provisional application No. 60/049,239, filed on Jun. 9, 1997.

(51) Int. Cl.[7] .................................................. H01R 43/00

(52) U.S. Cl. ................................ 29/858; 29/856; 29/883; 439/606; 439/736

(58) Field of Search ............................. 29/868, 883, 856, 29/858; 439/606, 736

(56) References Cited

U.S. PATENT DOCUMENTS

| 3,328,504 | * | 6/1967 | Hamel . | |
|---|---|---|---|---|
| 3,406,374 | * | 10/1968 | Martin | 29/883 |
| 3,664,018 | * | 5/1972 | McGregor | 29/883 |
| 4,059,988 | * | 11/1977 | Leh | 29/883 |
| 4,395,375 | * | 7/1983 | Ferris et al. | 29/856 |
| 4,981,438 | * | 1/1991 | Bekhiet . | |
| 5,261,806 | | 11/1993 | Pleasant | 425/144 |
| 5,795,511 | | 8/1998 | Kalantzis et al. | 264/40.6 |
| 5,926,952 | * | 7/1999 | Ito | 29/883 |

* cited by examiner

Primary Examiner—Carl J. Arbes

(57) ABSTRACT

There is provided a new and improved method for connecting electrical components in a mold with a molding press. The method includes the steps of connecting electrical leads to coded electrical connectors secured to the mold; connecting electrical connectors to detachable electrical cables; and extending and detachably connecting electrical cables to coded connectors of a junction panel or box. The electrical connectors at the mold may be color-coded and/or shape-coded as to pins or keys on the connectors; and likewise, the cables and the electrical connectors at the junction box may also be similarly color-coded and/or shape-coded.

4 Claims, 14 Drawing Sheets

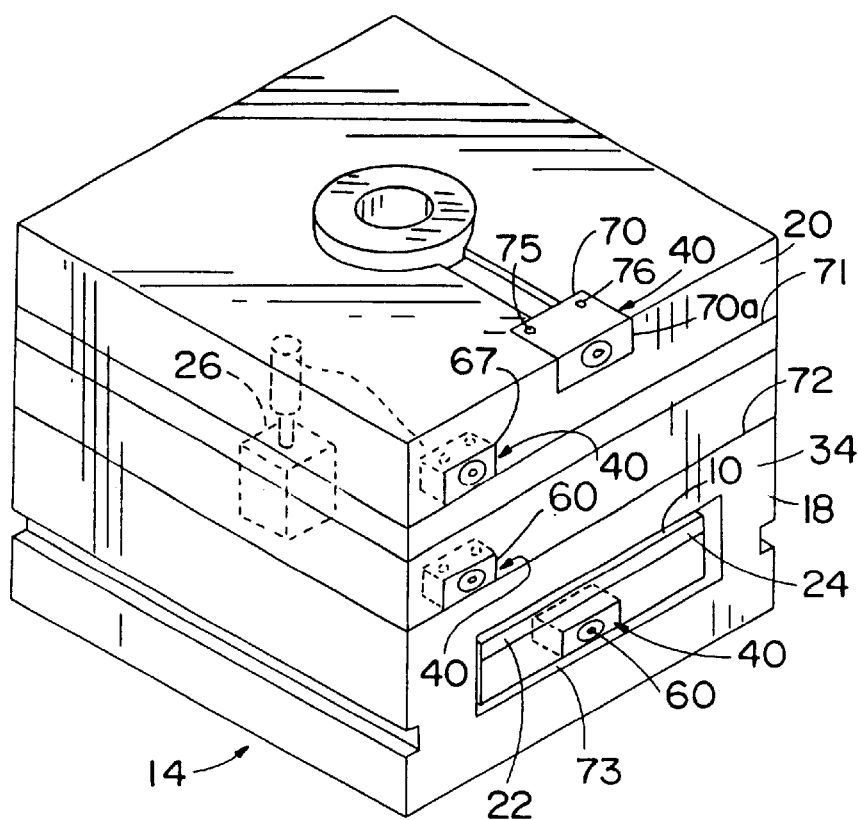
FIG. 2
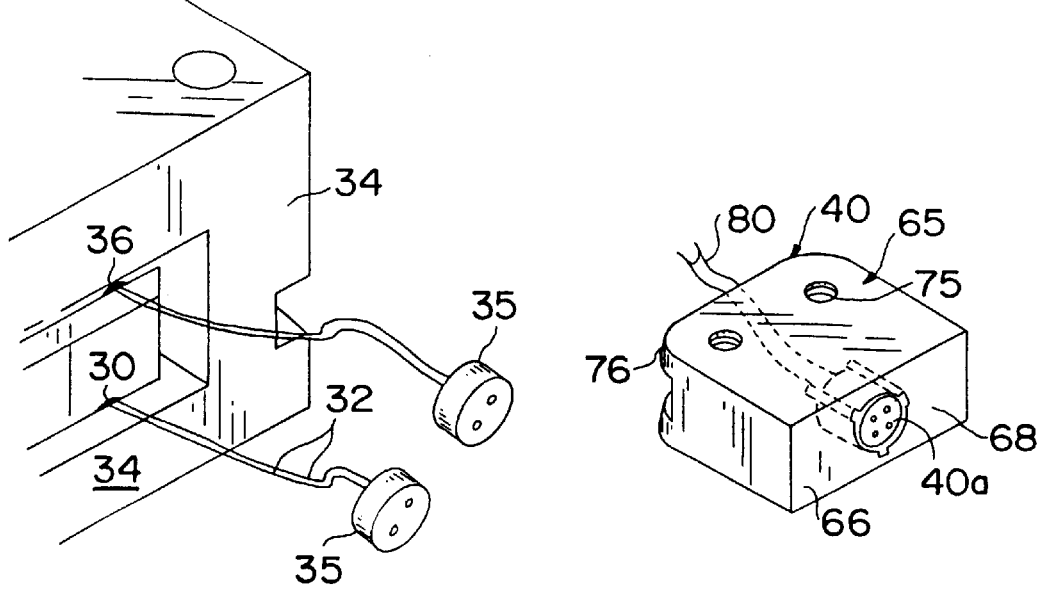
FIG. 3
PRIOR ART
FIG. 5

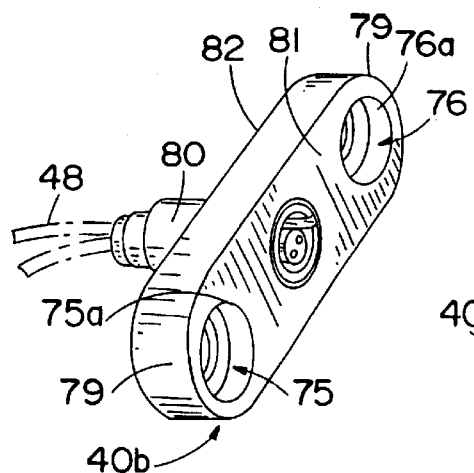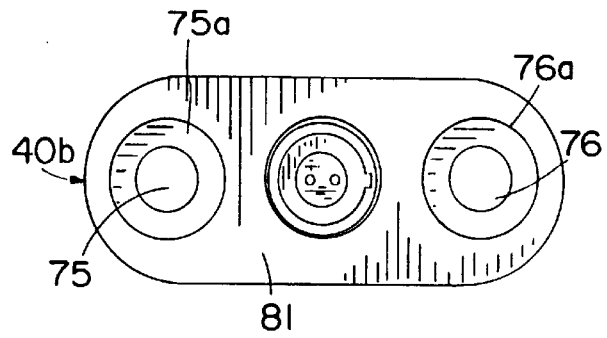
FIG.5A    FIG.5B
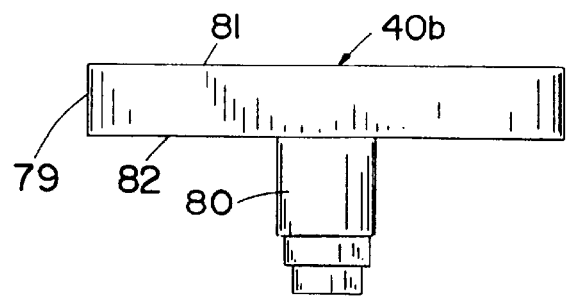
FIG.5C
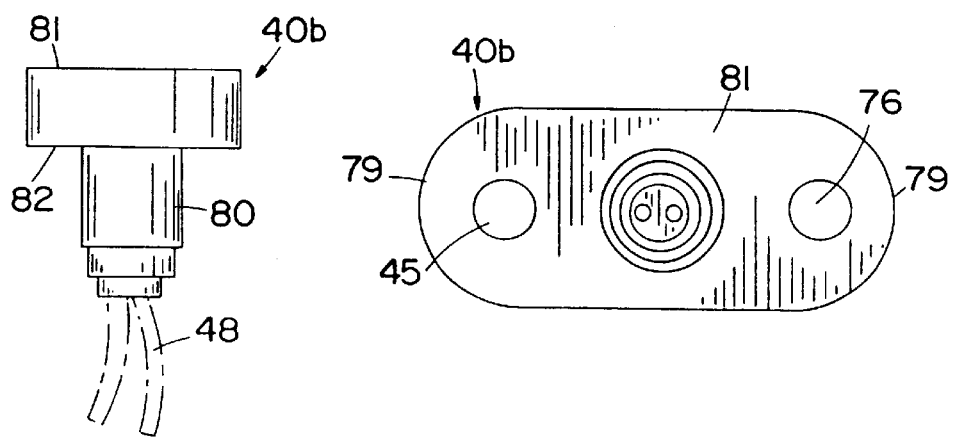
FIG.5D    FIG.5E

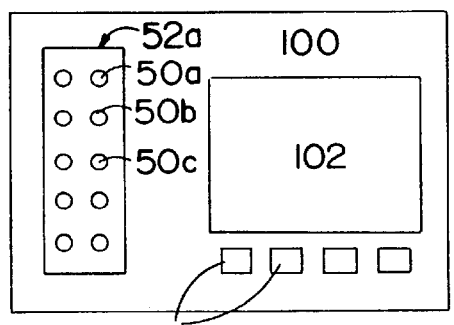
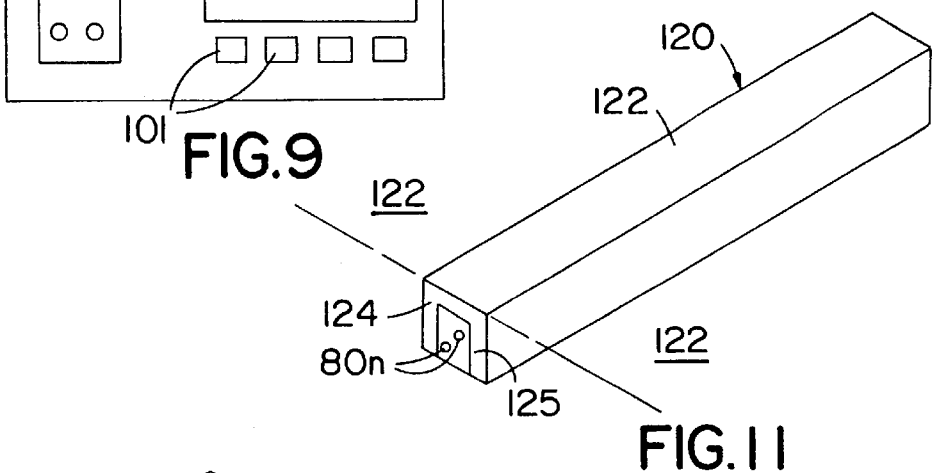
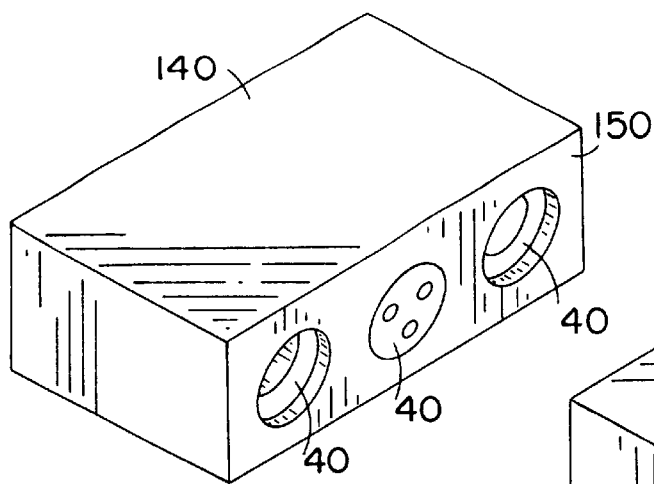
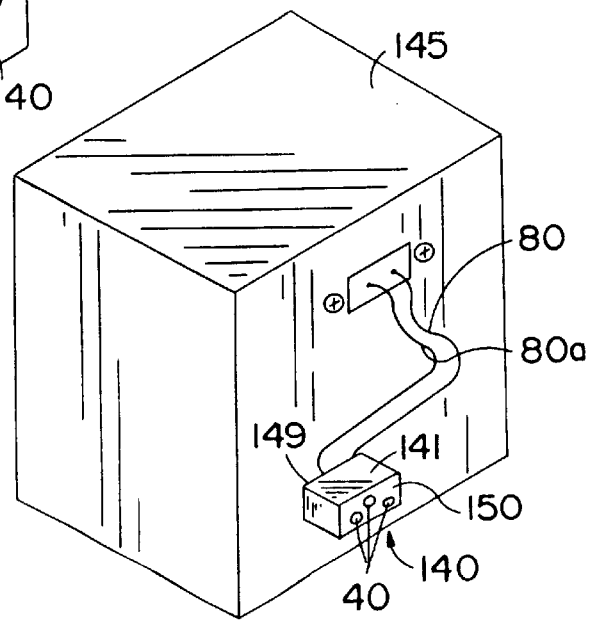

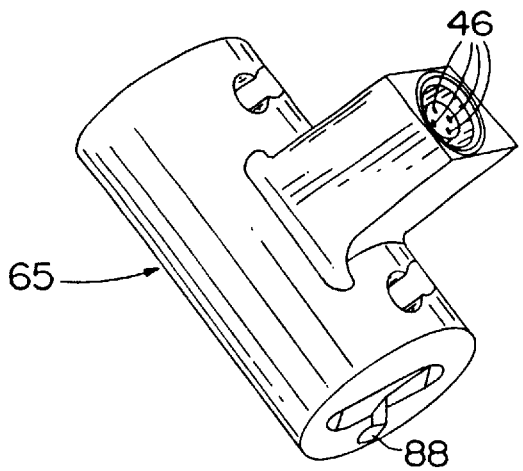
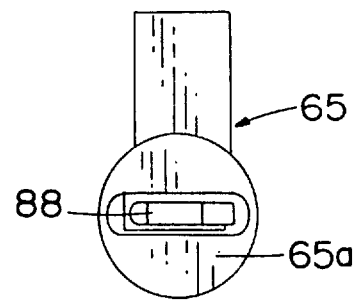
FIG. 16          FIG. 17
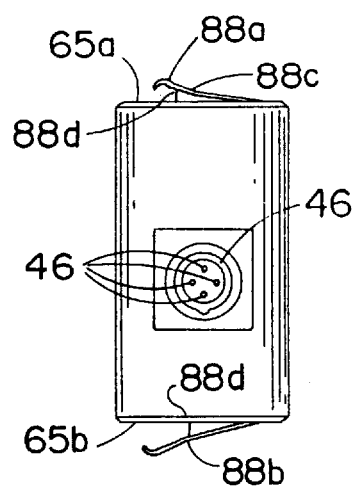
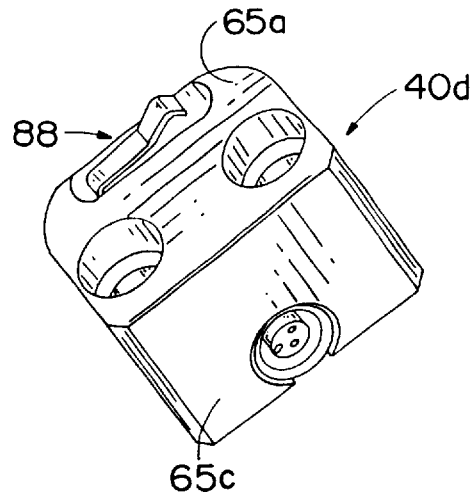
FIG. 18          FIG. 19
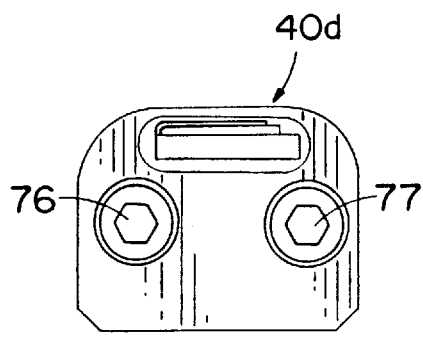
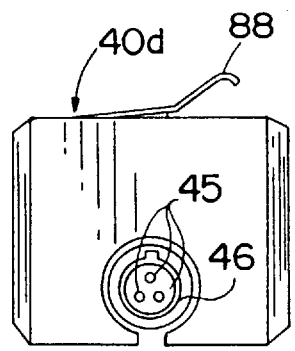
FIG. 20          FIG. 21

ELECTRICAL CONNECTION METHOD FOR MOLD COMPONENTS AND A PLASTIC INJECTION MOLDING PRESS

This application is a Division of application Ser. No. 09/093,431, filed Jun. 8, 1998, now U.S. Pat. No. 5,984,716, which claims the benefit of Provisional Application No. 60/049,239, filed Jun. 9, 1997.

BACKGROUND OF THE INVENTION

This invention relates to a method and an apparatus for making electrical connections between electrical components in a plastic mold and to a plastic molding press and to components used in such an apparatus.

Currently plastic injection molds are provided with an increasing number of electrical components disposed within the mold and which have various wires or leads connected thereto. These wires extend from the exterior of the mold and are for connection to a press or to a power source. Typically, some of the wires which are connected to the power source are used to supply electrical power for heaters such as used in a hot runner system or for heated sprues within the mold. A number of wires are connected to internal sensors having electrical switches which assure the positioning of the molding plates, cores or ejectors. Additionally, there are often cavity pressure switches which monitor the pressure within the cavity either of the moving mold half or the stationary mold half, or both. Often the switches are used to monitor the position of whether the mold is closed and whether or not there is a proper temperature at the mold or at various locations such as the sprue. Typically thermocouples are positioned within the mold to monitor temperature and electrical leads extend from the thermocouples outwardly of the mold. A problem with many molds today is that there is a risk of damaging lose wire when transporting the mold.

A mold maker makes many different molds, and many of the molds have a different assortment of electrical components therein. Some molds will have hot sprue bushings, hot runners and others will not. Some molds may have core limit switches which sense the positioning of the core while others do not have any such switches or cores. Also, the ejectors may have switches to show that the part ejection has taken place properly while other molds do not sense ejection.

The mold maker buys electrical components from various manufacturers and installs them in the mold in accordance with the particular specifications for any given mold. The terms used by different press manufacturers or different mold makers vary from one instance to another instance for the same type of component or the same type of sensor. There is no commonality as to terms used for the various particular sensors or heaters such that different presses will have different leads for connection labelled different than other press manufacturers to the same mold. Thus, depending where the mold is used, the person installing the mold will have to understand the various terms used for the electrical components as well as different terms which may be used by the press manufacturer. The various electrical components including switches and sensors are not specifically designed or built for easy installation into the mold.

The mold maker generally is under considerable time constraints to deliver the mold to the customer. Typically, a six to eight-week period is required for the making and delivery of a mold. Under such time constraints, the mold maker has little time or interest in a lack of uniformity of positions or names of any other electrical components that are in the mold.

At the other end, the mold press manufacturers each manufactures a press which is controlled in a different manner. Also, the same manufacturer will provide different presses to perform different functions such as runnerless molding, hot sprue bushing type of molding or various other types of molding. Most of the plastic molding presses have a computerized or programmable logic control system which operates the press. Often there is an interface with a process monitoring system that allows a monitoring of the injection molding press and mold with respect to operation and operating parameters. The common process system connects molding presses to a common computer which provides the data with respect to the operation of the molds and these presses. Many of the molds has a different operating sequence; and particularly, where they have different electrical components, there will be different inputs for a particular given mold. There is a need to identify the mold to make sure that the particular operating sequence is appropriate for the mold that is being placed in the press.

Upon delivery of a mold from the mold maker to the injection molding plant, the electrical leads are typically dangling from the sides of the mold. The dangling wires are often pinched, broken or sometimes pulled from the electrical component, thereby disabling the internal electrical component. There is a considerable expense involved in removing a disabled component from the mold. The cost of disassembling and reassembling the mold for the installation of a replacement component for that which was damaged because of the pulling of the dangling lead is an expensive proposition. In this situation, there is often a time constraint in that a very skilled person must be found with the know-how to assembly and disassemble molds.

Also, skilled personnel are required to connect the electrical leads from a mold to the press. The person who does this rigging or connection must know how the mold operates because the wires that are dangling therefrom need to be connected to the press, and he should know which wires are sensing what function in the mold. The skilled person usually must be able to connect a mold to each of several different presses made by different manufacturers because often, the same injection molding plant will have several kinds of presses. Also, the terms used for the different sensors are often varied from one press manufacturer to another press manufacturer, as likewise the components installed by a mold maker may be termed different from one mold manufacturer to the next mold manufacturer. It sometimes occurs that an incorrect connection is made--for example, a power lead may be connected to a thermocouple, it will destroy the thermocouple by electrically overloading the thermocouple. Sometimes, the PLC controller becomes damaged. A need exists for a system to simplify the mold set-up of electrical components.

Thus, there is a need for a new and improved system for connecting electrical components in an injection mold to various injection molding presses.

SUMMARY OF THE INVENTION

In accordance with the present invention, there is provided a new and improved system for connecting electrical components in a mold with a molding press. More specifically, in accordance with the present invention, the electrical components having electrical leads are connected to coded electrical connectors secured to the mold; and these electrical connectors are connected to detachable, electrical cables which extend to and are detachably connected to coded connectors of a junction panel or box. In the preferred form of the invention, the electrical connectors at the mold are color-coded as well as shape-coded as to pins or keys on the connectors; and likewise, the cables and the electrical connectors at the junction box are also similarly color-coded and shape-coded. Thus, the installer need not be a skilled person who understands completely the operation of the mold and of the press, but can follow the simple directions of connecting the coded, detachable cables between the press and the mold, each of which has the coded connectors which can only be connected together by one cable. In the preferred embodiment of the invention, each of the cables has the same coded connector at each end, with cable having the same color as the color of the mold connector and of the panel connector. For the purpose of coding, an extra lug may be provided on the circumference of the connector and a special arrangement of the pin or metal contacts may be provided on the connector. For example, a lug may be provided at a 12:00; and there may be two vertically disposed pins for connection for a particular thermocouple; and the next thermocouple may have a pair of pins horizontally disposed with a lug located at a 3:00 position. Of course, the different colors will be used for different cables and connectors for color coding.

In accordance with another aspect of the invention, the junction panel or junction box has a large number of input coded connectors connected to the coded cables and only one or a few output multiple pin connectors. For example, there may be as many as 13 sensor input connectors on the input side of the junction box. Each of these input connectors is attached by internal leads within the junction box to a common pin connector. For example, a 36 pin connector is connected to the control cable from the computer control system for the molding press. Often where there is a heater with power to be needed, there will be one or more appropriately labelled connectors on the output side of the junction box, which will be connected to the power cable to provide the power necessary for the heater, such as a hot sprue bushing heater. Preferably, the junction box provides a fused circuit between the mold, junction box circuits and the programmable logic controller (PLC) to prevent damage to the PLC.

The present invention is also particularly useful in trying to establish a uniform nomenclature or common terms for use for the particular electrical components that are being used. It is preferred to provide a written description for each connector on the junction box that is most commonly used.

In accordance with another important aspect of the invention, it is preferred to make the electrical connectors on the mold flush or recess mounted on a mold wall so that they do not project beyond the mold wall and thus, are not positioned to be knocked off or broken in transportation or storage. Typically, molds are very large, heavy pieces which are moved by forklift trucks or the like; and when the dangling connectors are hit against something, the connectors will be pinched or broken off.

In accordance with another aspect of the invention, the connectors at the mold are mounted in connector housings which are also color-coded and which have a predetermined shape to be fitted into a molded recess or cavity which will be made by the mold maker at the time of mold manufacture. For example, the mold may have at the parting line and a cavity may be machined downwardly into a horizontal, parting-line face and also extending into a vertical face of the mold. The cavity is sized such that the housing may fit exactly therein. Screws or other fasteners may be used to secure the connector housing within the cavity in the mold and with the connector flush with the vertical face of mold.

The present invention provides standardized, coded mold connectors to simplify the understanding of the electrical connections for the mold manufacturer as well as the molder who is installing or changing a mold in his molding press. Also, the mold connectors are recessed into the mold to protect the electrical receptacles from damage during transport and preferably the connectors have differently shaped housings each for fitting in an associated shape for the cavity receiving the connector. In many instances, the housing is a compact design which houses both the switch and the electrical connector.

For retrofitting existing molds, there may be provided a junction box which may be attached to the face of the mold; and the respective leads from the various electrical components may be brought to and connected to the coded connectors on this mold junction box. Thus, there will be a junction box on the mold which can have a heavy-duty housing which will contain and protect a number of coded connectors for connection to the detachable, coded cables as above-described.

BRIEF DESCRIPTION OF THE DRAWINGS

FIG. 2 is a perspective view of a mold embodying the invention;

FIG. 3 is a view of a prior art mold, electrical wires and connectors;

FIG. 5A is a perspective view of a recessed connector constructed in accordance with the preferred embodiment of the invention;

FIG. 5B is a plan view of the recessed mold connector of FIG. 5A;

FIG. 5C is a front elevational view of the recessed mold connector of FIG. 5A;

FIG. 5D is an end view of the recessed mold connector of 5A;

FIG. 5E is a bottom view of the recessed mold connector of FIG. 5A;

FIG. 9 is a view of a junction panel of FIGS. 6 or 7 mounted as a panel of a molding press;

FIG. 11 is a perspective view of a cover channel for a slot in a mold plate leading to a hot sprue bushing;

FIG. 12 is a rear view of the junction box of FIG. 13;

FIG. 13 is a retrofit embodiment of the invention having a coded junction box on the mold;

FIG. 16 is a perspective view of a dual ejector switch for verifying ejector plate position having both ejector back and ejector forward switches thereon;

FIG. 17 is an end view of the dual ejector switch mold connector of FIG. 16;

FIG. 18 is a side elevation view of the dual ejector switch, mold connector of FIG. 16;

FIG. 19 is a perspective view of a plate position switch, mold connector for verifying plate location and constructed in accordance with the preferred embodiment of the invention;

FIG. 20 is a plan view of the mold connector of FIG. 19;

FIG. 21 is a front elevational view of the plate position switch, mold connector of FIG. 19;

DETAILED DESCRIPTION OF THE PREFERRED EMBODIMENTS

Figure 1:
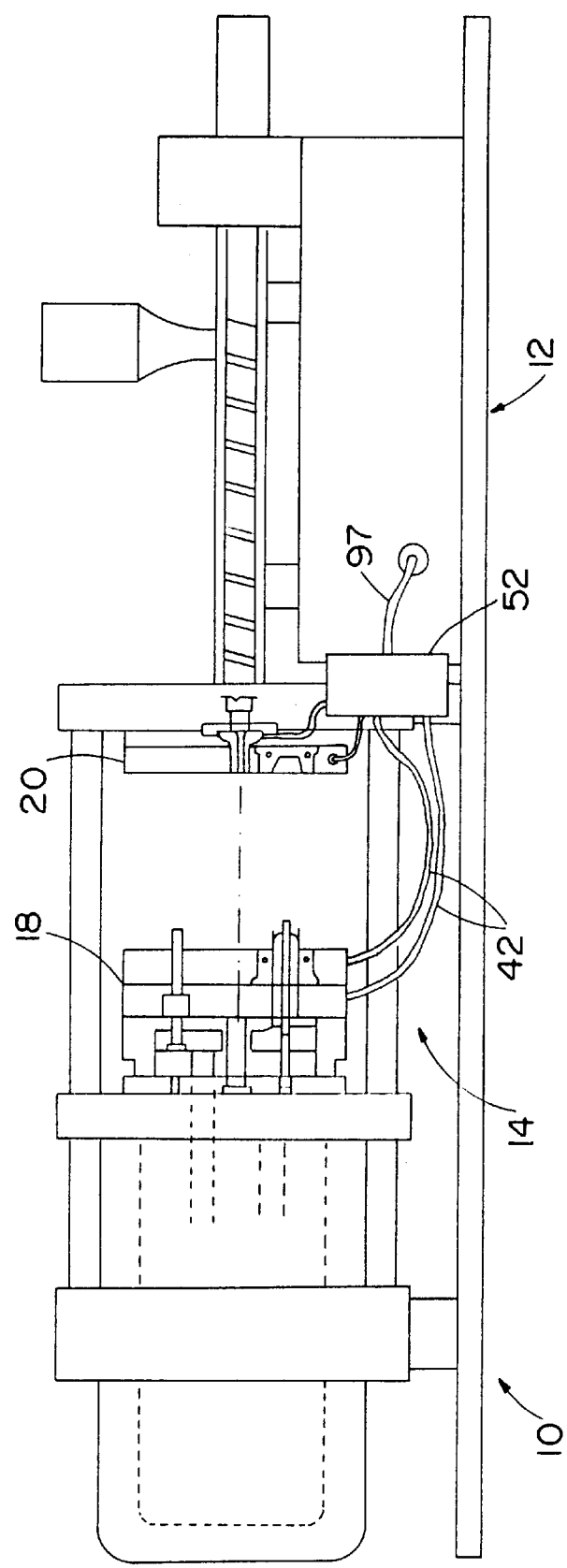
FIG. 1 is a diagrammatic view of a plastic mold and a plastic injection molding press.

As shown in the drawings for purposes of illustration, the invention is embodying in a molding system 10 which includes a molding press 12 and a mold 14. Between the mold and the molding press are a series of electrical wires or cables. The mold, as best seen in FIG. 2, comprises a lower, movable half 18 and an upper, stationary half 20. An ejector plate 22 is provided for movement within the mold to eject parts from an internal mold cavity 26. As best seen in FIG. 3 in the conventional prior art method, there is a limit switch 30 that detects the downward, full retraction of an ejector plate 22 and provides a signal over a pair of wires 32 extending and dangling from a vertical face wall 34 of the lower mold half. These wires 32 may have a connector 35 at an end thereof. A similar pair of wires 32 may extend outwardly from an upper limit portion switch 36 for the ejector plate and along the vertical face wall of the mold and dangle to an attached electrical connector 35. Such dangling wires are often pinched off or pulled from the internal electrical components, such as the limit switches 30 and 36, particularly during transport of the mold. The electrical connectors, receptacles and wiring provided vary from one mold maker to the next mold maker, and this adds to the likelihood of confusion of the person installing the mold and doing the electrical wiring to the controller for the press.

In accordance with the present invention, the lack of a systematic approach and the use of dangling wires 32 and the dangling connectors 35 (FIG. 3) have been replaced by a new and improved system wherein mold connectors 40 (FIGS. 1 and 1a) which are mounted on the mold 14 are coded and connected by detachable, coded cables 42 (FIGS. 1, 1a and 4) having coded cable connector plugs 43 and 44 at each end of the cable. The system of this invention also includes a junction panel or box 52 mounted on or near the press. Thus, when removing one mold from the press, the coded cables 42 may be detached from the mold connectors 40 quickly and, if desired, also be quickly disconnected from junction box connectors 50 on a junction box 52 which is connected to a mold controller. A new mold having similar mold connectors 40 thereon may be installed in the press and the operator may use same, new and/or additional coded cables 42 to connect the junction box 52 to the newly installed mold without reference to a wiring guide and with more assurance of a correct connection between the controller and the electrical components in the mold. Usually, the junction box will be attached to the mold platen or otherwise mounted on or adjacent the press.

Figure 1A:
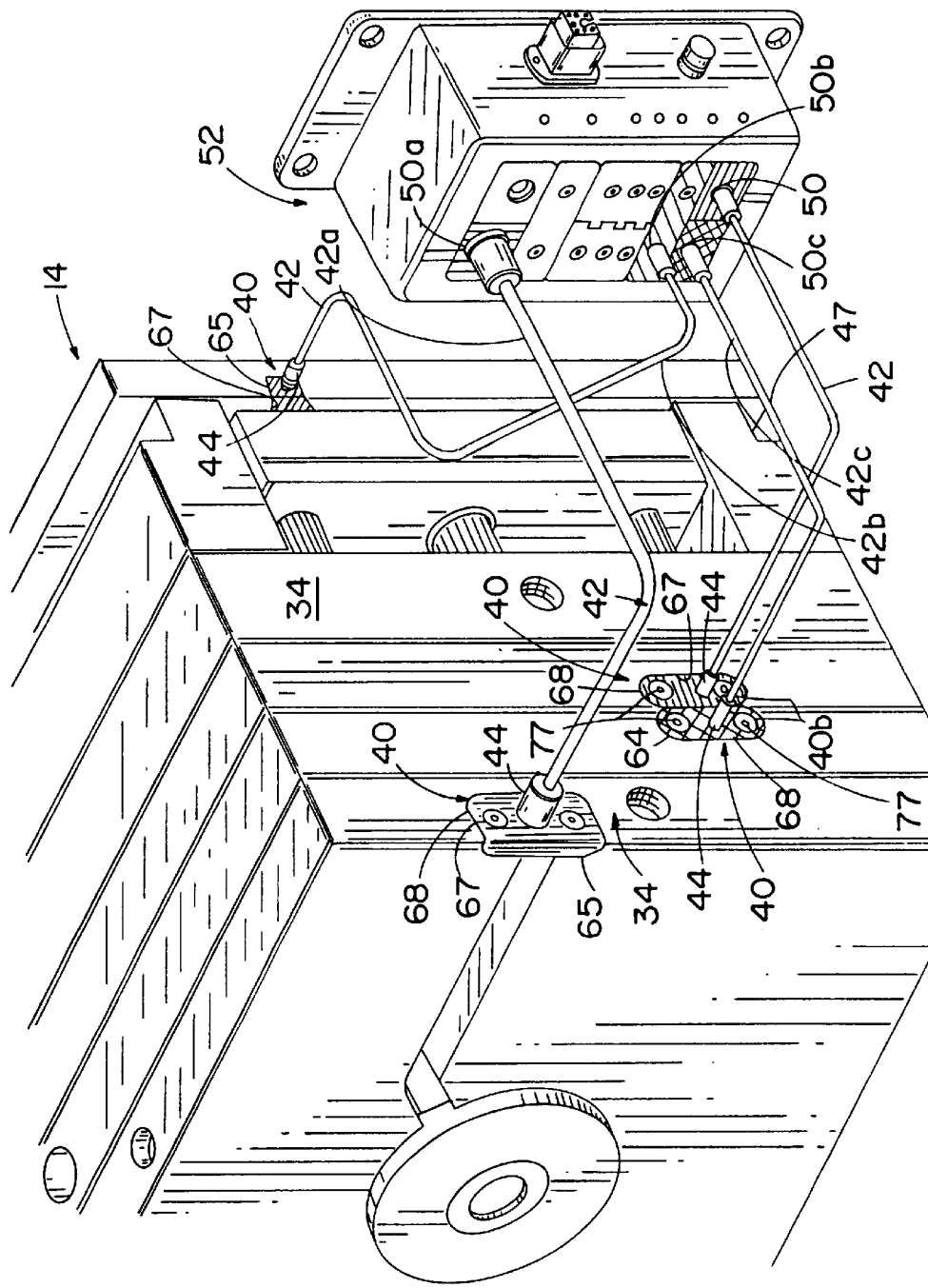
FIG. 1A is a perspective view of a junction box with coded detachable cables connected to mold connectors on a mold in accordance with a preferred embodiment of the invention.

In accordance with an important aspect, each of the electrical components on the mold having leads is provided with a mold connector 40 with a molded body of a distinctive shape and/or color (as shown in FIG. 1A) and is connected to a suitable junction box connector 50a, 50b, 50c, etc. by an appropriate color-coded cable 42a, 42b, 42c, etc.

Figure 22:
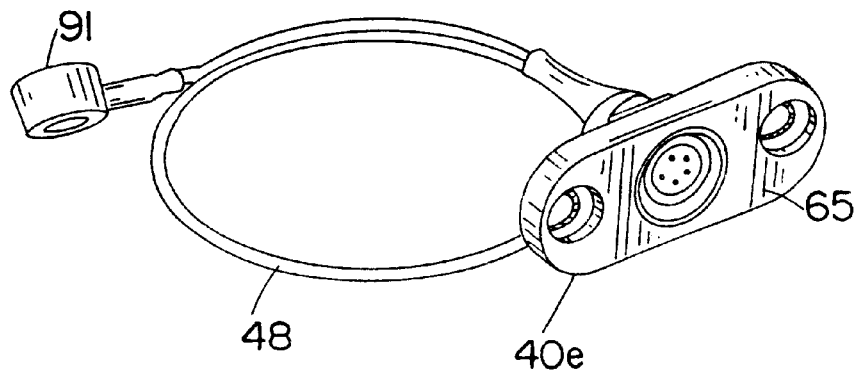
FIG. 22 is a perspective view of a cavity pressure mold connector connected by an electrical lead to a button-style cavity transducer and constructed in accordance with the preferred embodiment of the invention.
Figure 26:
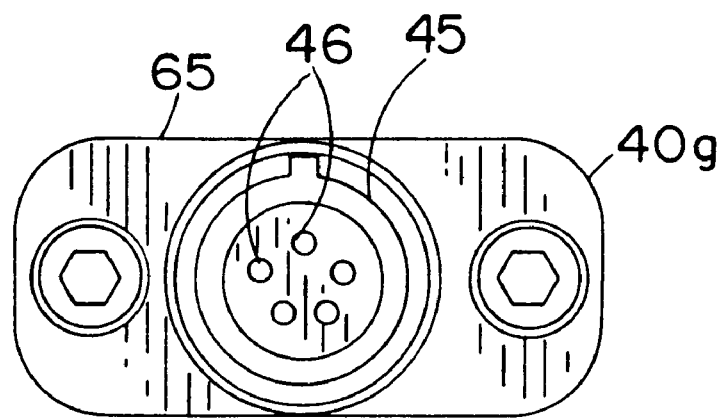
FIG. 26 is a front elevational view of the mold connector of FIG. 25.

The preferred coding of the mold connectors is by way of color and the number of pins 45 in an electrical receptacle 46 portion of the mold connector. The pins 45 are hollow cylindrical, electrical contacts to receive and make electrical connection with a cylindrical prong or projection contacts 56 on a plug 43 or 44. The receptacles 46 are commercially available electrical connector receptacles available from many manufacturers. Usually, the pins 45 are spaced at equal angles from one another along a circular path having a common axis at the center of the receptacle. Thus, a three pin receptacle having 3 pins 45 (FIG. 21) will have its three pins at 120° to each other while a receptacle with four pins 45 (FIG. 18) will have its pins at 90° to each other. Thus, a plug with three prongs at 120° won't fit into a four pin receptacle with pins at 90° to one another. Receptacles 46 with five pins 45 are illustrated in FIGS. 22 and 26.

By way of example only, herein the color-coding is red and five pins for hot sprue bushings; yellow and five pins for cavity pressure transducers; gray and three pins for enable switches; black and three pins for core in; green and four pins for ejection switches; and orange and blue and two pins for thermocouples. Manifestly, the color and the number of pins can be changed from that described above and still fall within the ambit of this invention.

Figure 4:
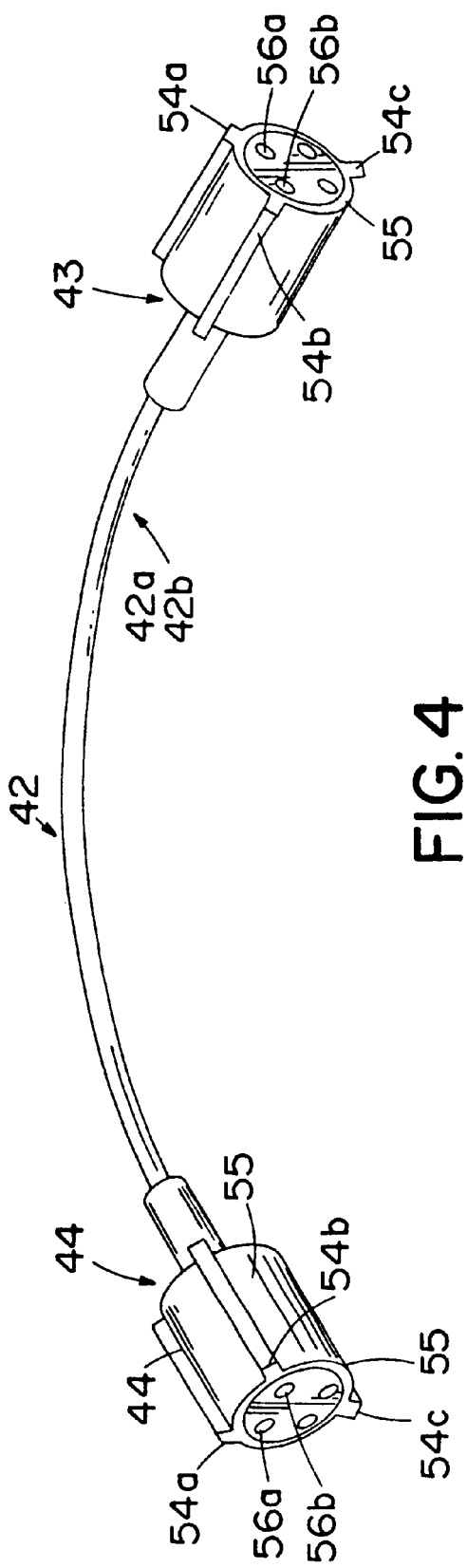
FIG. 4 is a perspective view of a color and shape-coded, detachable cable.
Figure 4A:
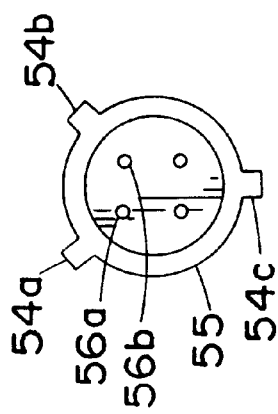
FIG. 4A is a front, elevational view of a coded connector on an end of a detachable cable.

It would be possible to provide other coding schemes such as that disclosed in FIG. 4 where exterior lugs or locators 54a, 54b and 54c are formed on the outer sides of the plugs 43 and 44 and similar sized and shaped slots 52 where formed in the mold connector 40 and in the junction box connector 50 to receive the locator lugs 54a, 54b and 54c. The cables 42, mold connectors 40, and the junction box connectors 50 were also color-coded. In the embodiment shown in FIG. 4, the plug connector 44 (shown in FIGS. 4 and 4A) has three sets of locators 54a, 54b and 54c disposed at three different positions in a circumferential manner about the circumference of the connector wall 55. Likewise, this particular plug connector is formed with four electrical contacts or pins 56a–56d. Some of the electrical contacts may be electrically connected or others may be just provided as part of the physical shape coding. It will be understood that the similarly coded block connector 40 on the mold will have three slots arranged to receive the locators 54a, 54b and 54c on the cable connector plug 43a, and the connector 40a will have four aligned sockets or receptor contacts for making electrical contact with the four contacts shown in FIG. 4.

Preferably, each end of the cable 42a has identical electrical plugs 43 and 44 coded in the same manner so as to match an associated coded mold connector 40 and coded junction box connector 50. The junction box connector 50 at the junction box 52 to receive the plug 43 of FIG. 4 is provided with three identical slots around its circumference and which correspond in size, shape and position to the three locations 54a, 54b and 54c on the plug 43 to be connected to the box connector 50. Also, the junction box connector 50 will have four electrical contacts sized and positioned to receive the four electrical contacts 56 of the plug 43a at the end of the cable 42a.

In accordance with another and important aspect of the invention, it is preferred that each of the mold connectors 40a, 40b, 40c, etc. may be flush-mounted on a face such as the vertical face 34 of the mold 14, as shown in FIGS. 1A and 2, or otherwise mounted within the confines of the mold so as not to be damaged when the mold is transported. That is, each mold connector has a mold body 65 an outer face or side 68 which is flush-mounted in the plane of the vertical mold wall 34 or in a slight recess in the vertical wall 34 so that there is no substantial projection of a mold connector 40 beyond the vertical wall. In some instances, such as when retrofitting existing molds, the mold connectors 40 (not shown) may be externally mounted to the outer face 43 of the mold. The housings 65 of such externally mounted mold connectors may be coded, both by color and also by having their pins 45 coded for the specific function. The detachable cables 42 may be used with these externally mounted, mold connectors to connect them to the junction box 62 in the manner described above for the flush-mounted mold connectors 40.

It is preferred to have the particular mold connectors 40 mounted in a housing or block 65 which is preferably in the form of a block-shaped housing or body (FIG. 5) which has an outer color-coded face 68 which would be flush or parallel with one of the face walls 34 of the mold. The housing 65 is fitted into a recessed cavity 67 milled or otherwise formed in the mold 14. By way of example, as shown in FIG. 5, the electrical mold connector 40a will have its outer face 68 flush with the face 66 of its body 65; and the electrical receptacle for connection to the plug 44 will be embedded within the housing 65, which can be made of plastic or of a metal material. By way of example only, the illustrated body 65 is approximately two inches in depth, one and one-half inches in horizontal length, and about three-fourths of an inch in height. Typically, the pockets or cavities 67 for the housings will be milled into the mold by the mold maker when making the mold and will be formed at a juncture of a horizontal face or wall 70, 71, 72 or 73 with a vertical sidewall 34 of the mold (as shown in FIG. 2) so that they may be cut down and extend outwardly to be flush with the vertical sidewall 34 of the mold. Thus, each of the connectors may be dropped into position in a pocket in a mold, and it may be fastened by screws or other devices through screw fastener receiving holes 75, 76 (as shown in FIG. 5). As best seen in FIG. 5, the particular electrical connector 40a is connected by leads 80 which extend back to the particular device such as a cavity pressure sensor.

Referring now to FIGS. 5A–5E, there is shown a typical recessed mold connector 40b in greater detail. A pair of such mold connectors 40b are shown side-by-side in FIG. 1a. The recessed connectors protect the electrical receptacles from damage during transport of the mold. The mold connectors are color-coded and keyed for the specific function with pin assignment tags included. By way of example only, red connectors may be for hot sprue bushings, yellow connectors for cavity pressure switches, gray may be for an enable switch, green may be for an ejection switch, orange for a stationary T/C switch, and blue for a movable T/C switch. By way of example only, the red coded sprue bushing mold connector has five pins 45 in its receptacle. The mold connector for enable switches is gray and is coded with only two pins 45. In the recessed connector switch shown in FIGS. 5A–5E, the molded body 65 has fastener receiving holes 75, 76 with enlarged, counterbores 75a and 76a to allow the heads of fasteners 77 to be mounted within the block body and not project beyond the outer face 68 of the mold body or the flush face of the mold, as seen in FIG. 5E.

The illustrated recessed connector 40b shown in FIGS. 5A–5B is formed with rounded corners or ends 79. The main plastic body 65 has parallel, flat faces 81 and 82. The electrical receptacle has a rear cylindrical portion 80 which projects from the rear face 82. A channel 84 will be drilled in the mold to allow wires 48 from the electrical switch or device to be connected to the rear of the receptacle, as shown in FIG. 5D.

Figure 14A:
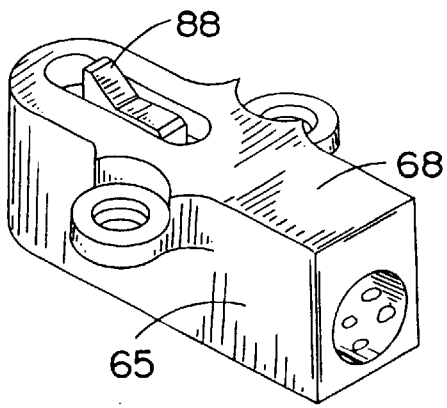
FIG. 14A is a perspective view of a mold connector with a switch to verify the ejector plate position.
Figure 14B:
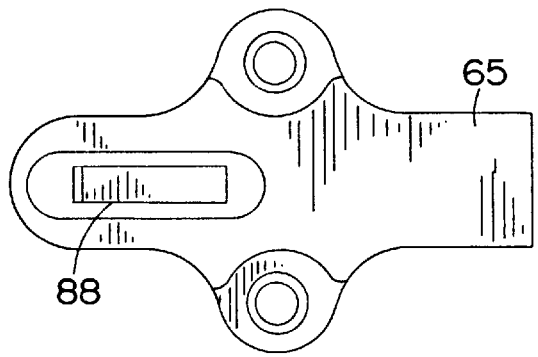
FIG. 14B is a plan view of the switch mold connector of FIG. 14A.
Figure 14C:
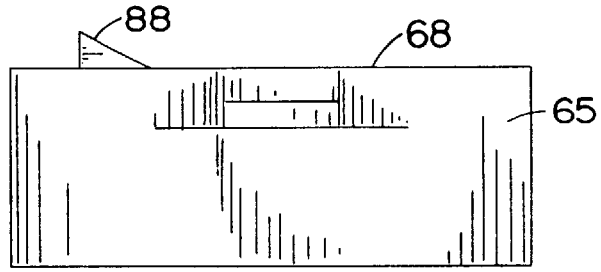
FIG. 14C is a front elevational view of the switch mold connector of FIG. 14A.
Figure 14D:
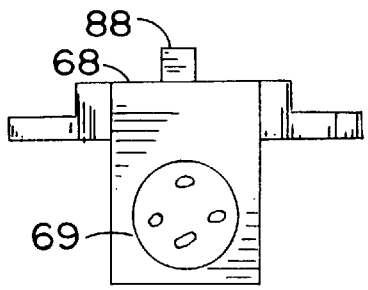
FIG. 14D is an end elevational view of the switch mold connector of FIG. 14A.
Figure 14E:
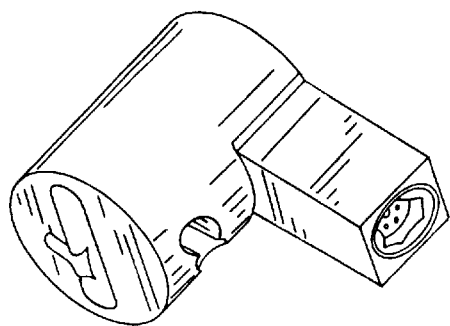
FIG. 14E is another embodiment of a switch mold connector constructed in accordance with a preferred embodiment of the invention.

A mold connector 40c is shown in FIGS. 14A–14D with an internal switch 88 which is to be engaged and operated to verify an ejector plate position before the next controller sequence. The body 65 is formed about and contains therein, in situ, the limit switch 88 which has an upwardly extending push button 88 that extends above the outer face 68 of the molded body 65, as best seen in FIGS. 14A and 14C. The illustrated body 65 is a die cast about the switch receptacle 45 with four pins 46 in a rear wall 69 of the die cast body 65. As best seen in FIG. 4, a face 90 of an ejector plate 92 may move into engagement with the push button 88 and depress it to change the normally open or normally closed position of the switch contacts with the switch. The illustrated K.O. switch shown in FIGS. 14A–14D is usually color-coded green for its ejection function. The forms of ejector switches (not shown) are single ejector K.O. switches to verify that the ejector plates are back before the next controller sequence. Another shape and design of a single ejector K.O. switch, mold connector 40 is shown in FIG. 14E to verify that the ejector plates are back before the next controller sequence. Also, dual ejector K.O. switch mold connectors 40d may be provided as shown in FIGS. 16–18.

As best seen in FIGS. 16–18, dual ejector switches 88a and 88b are provided at opposite ends of the housing body 65 projecting beyond end walls 65a and 65b. Within the body 65 is a receptacle 45 with pins 46 to plug into a cable plug 44 of a cable that has another plug 43 connected to the junction box. The dual ejector connector 40c is generally T-shaped with the receptacle projecting at right angles to the respective ejector back switch 88a and ejector forward switch 88b. These switches are connected to a pair of leads that are connected to the pins 46 that are to be electrically connected to the mating contacts in a cable plug 44 which, in this instance, is on one end of a cable having a plug 43 when plugs into one position, junction box connector 50 of the junction box 52. The switches 88a and 88b are limit switches with an upstanding spring actuator 88c that when depressed pushes down on a reciprocable pushbutton 88d (FIG. 18) of a conventional limit switch.

Another mold connector 40d (FIGS. 19–21) contains a plate position switch 88 that verifies the plate location. The switch 88 in the connector 40d has a spring actuator 88c that is engaged by a plate and deflected downwardly, as viewed in FIGS. 19–21. The body 65 is generally block shaped with a pair of bores 76 and 77 in a top wall 65a of the body to receive screw fasteners to secure the body 65 in position. The receptacle 46 is mounted in the body and it opens into a lower portion of a vertical sidewall 65c of the body. The pins 45 are available for connection to a three pin plug 44 of a cable 42. This plate ejector connector 40d is positioned in the mold with its deflectable, upstanding contact that is mounted at the parting line to be pushed down to verify the plate location before the next controller sequence is initiated.

Figure 23:
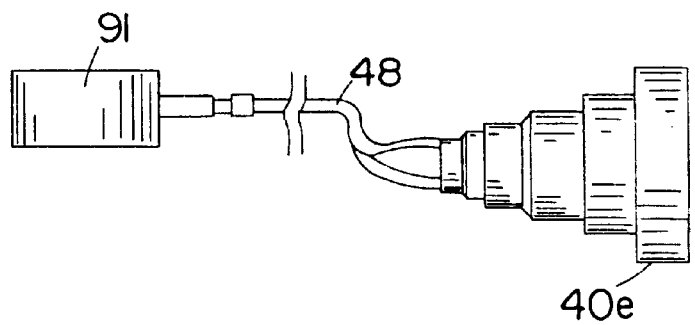
FIG. 23 is a side elevational view of the mold connector and cavity pressure transducer of FIG. 22.

A cavity pressure mold connector 40e is shown in FIGS. 22 and 23 and it includes a receptacle 45 with a wire 48 extending to a button-style transducer 91. The transducer measures injection pressure within a mold and its recessed mold connector 40e is permanently mounted in the mold by screws placed through openings 76 and 77 in the connector body 65. The connector body is color-coded and is also pin-coded for connection to coded, detachable cable 42.

Figure 24:
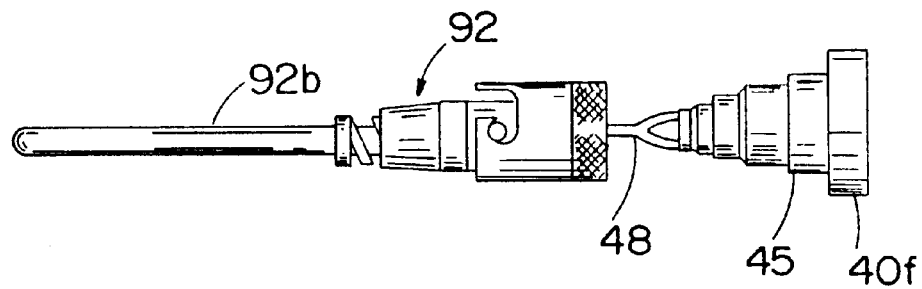
FIG. 24 is a side elevational view of a thermocouple, mold connector having a lead connected to a thermocouple and constructed in accordance with the preferred embodiment of the invention.

A thermocouple 92 (FIG. 24) for temperature measurement in a mold is connected by a wire 48 to a receptacle 45 molded in situ in recessed mold connector 40f. The thermocouple 92 has a bayonet lock adapter 92a attached to the inner end of the wire to allow replacement of the thermocouple sensory element 92b. The thermocoupled connector 40f is both color- and pin-coded for detachable connection to a coded cable 42.

Figure 10:
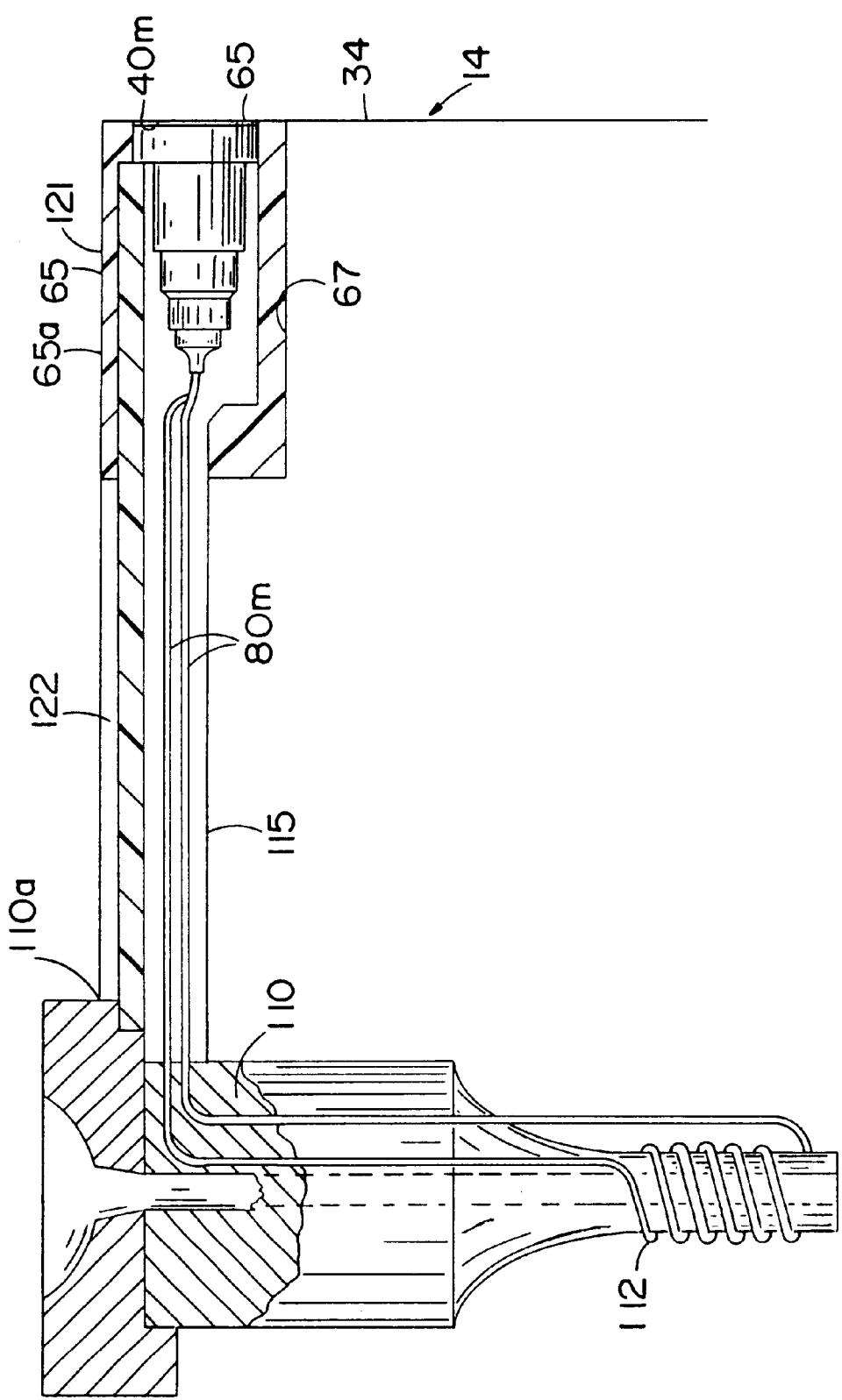
FIG. 10 is a sectional view of a mold having a connector housing aligned with a slot having wires leading to a heated sprue.
Figure 25:
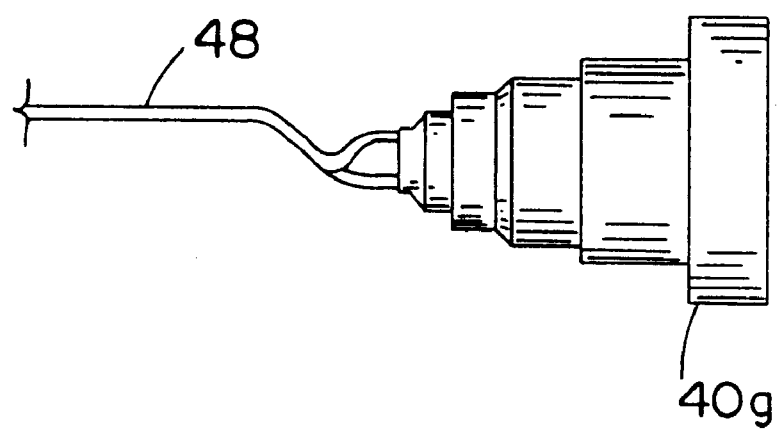
FIG. 25 is a hot sprue bushing, mold connector constructed in accordance with the preferred embodiment of the invention.

FIGS. 25 and 26 illustrate a recessed connector 40g for a hot sprue bushing with the connector having a receptacle 45 with five pins 46. The receptacle is mounted in a recessed connector body 65 and projects inwardly therefrom, as best seen in FIG. 25. The recessed connector 44f is mounted flush with the mold wall 34, as shown in FIG. 10.

Figure 6:
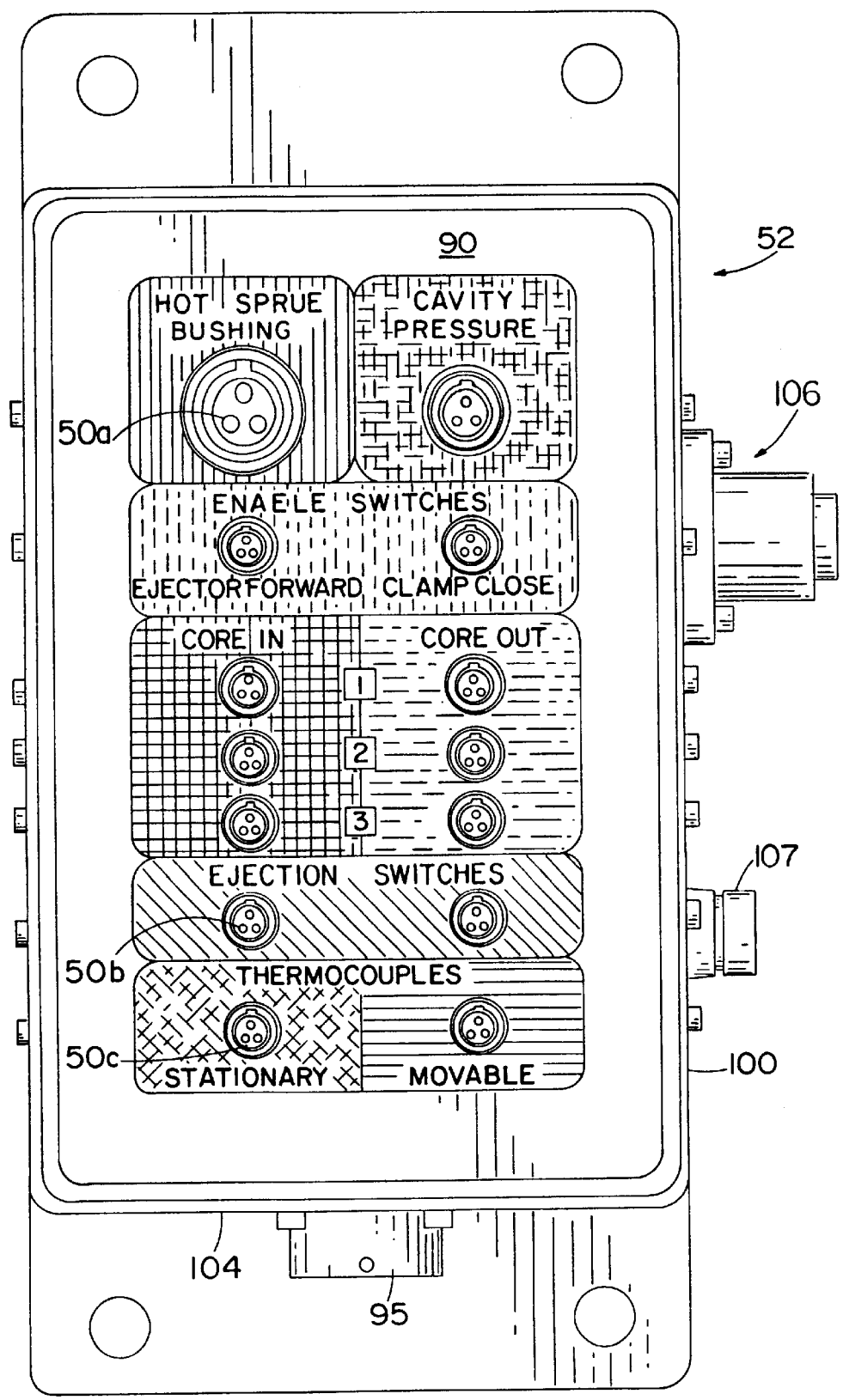
FIG. 6 is a front view of a junction panel or box.

The junction box 52, illustrated in FIG. 6, is color-coded as can be seen with the color "yellow" for the cavity pressure cable, the color "black" for the clamp close switch, the color "tan" for the core out, the color "green" for ejection switch, the color "dark blue" for one of the movable thermocouples, and the color "light blue" for the stationary thermocouple. Brown, gray and red are also shown as other colors used in the example of FIG. 6.

Figure 7:
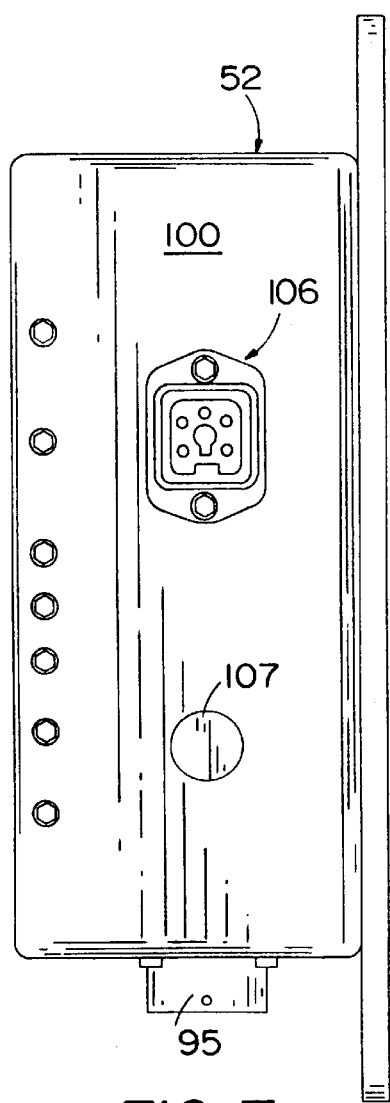
FIG. 7 is a side elevational view of the junction box of FIG. 6.
Figure 8:
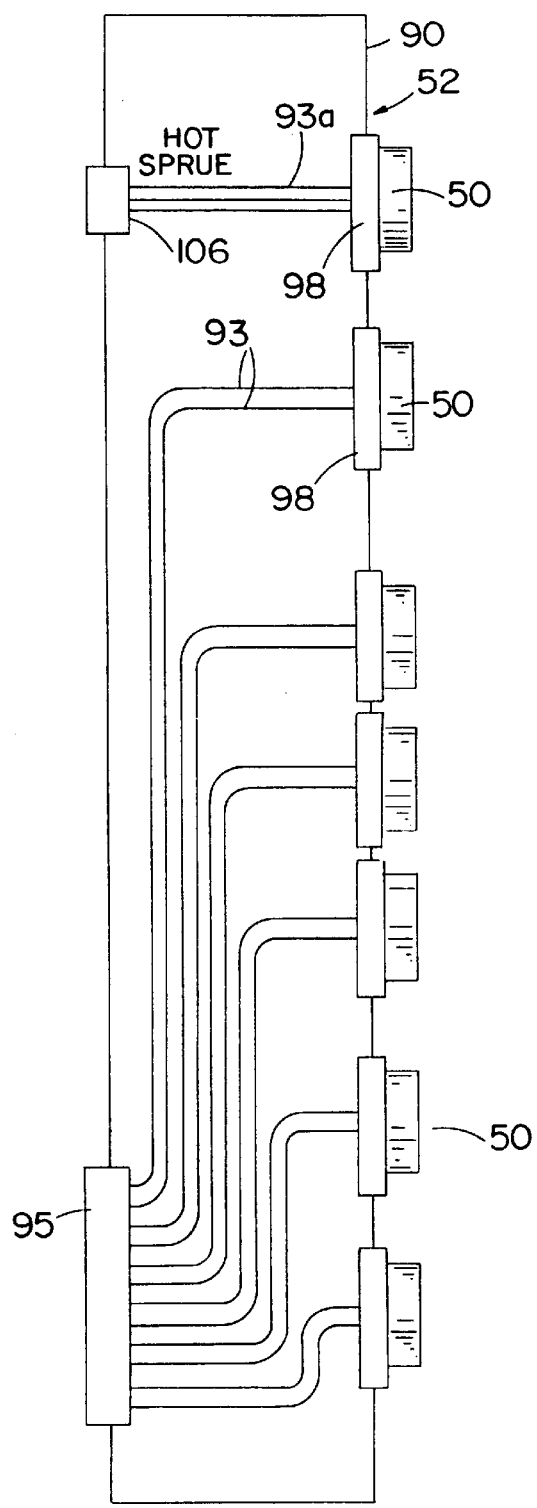
FIG. 8 is a diagrammatic side view of a junction box showing internal wires therein.
Figure 15:
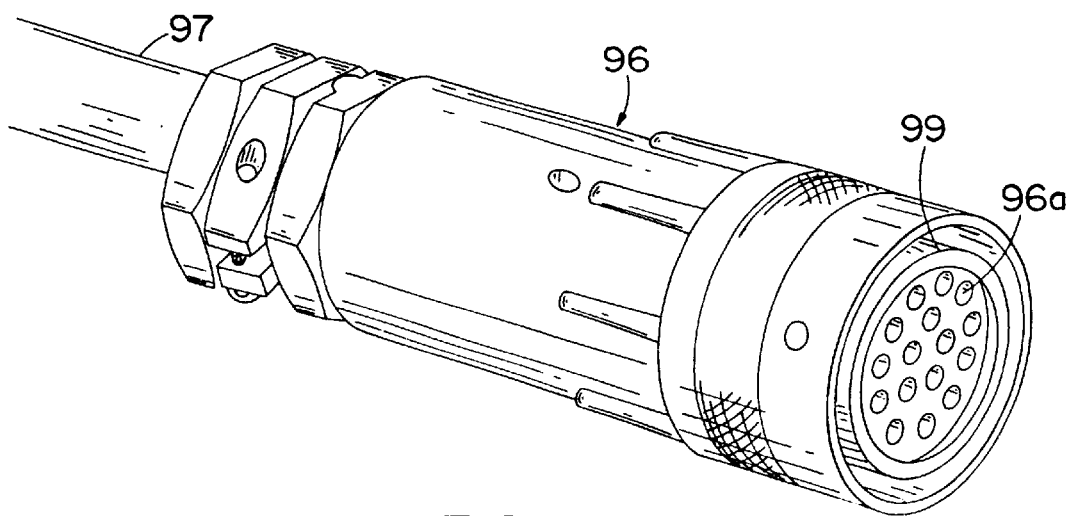
FIG. 15 is an end view of a cable connector plug constructed in accordance with the preferred embodiment of the invention.

As best seen in FIGS. 6–8, the junction connectors 50 are mounted on a first or an outer face or front face wall 90 of the junction box 52, which has an interior, hollow compartment having leads 93 therein extending from the respective connector receptacles 98 in the junction connectors 50 to a common output connector 95 located at a bottom wall 104 (FIG. 6) of the junction box. The common output connector 95 is connected to a suitable connector 96 for a large computer cable 97. The illustrated common connector 95 is a computer-style connector which has thirty-six (36) pins 96a for connecting to a 36 pin receptacle 99 (FIG. 15) to a computer-like cable 97 (FIG. 1) which will go to the electrical control system for the press 12. The junction box 52 may be either on or attached to the machine, as it is not intended to be moved with the mold. The junction box 52 shown in FIG. 6 has a square style, 5 pin connector 106 on sidewall 100 for connection to a hot sprue temperature controller. A replaceable fuse 107 (FIG. 6) may be provided on sidewall 100 and connected internally to provide a fuse connection that will open and break the electrical connection between the electrical connector 95 leading to the controller and the mold connectors 50 connected to the cables 42. When making a new, original equipment press, it may be preferred to provide a junction panel 52a on a back panel 100 of the press (such as shown in FIG. 9) with the particular connectors 50a, 50b, 50c, etc. on the junction panel 52a. The junction panel 52a may be identical to that shown in FIGS. 6 and 7. The back panel 100 of the press may have other control features 101 and 102 in addition to the junction panel 52a having the color-coded connectors for receiving the compatible connector plugs on the end of the cable.

The cables 42 that are connected through connector 95 to the controller have very little current or power flowing through as they mostly carry signals representative of a switch opening or closing position or a temperature signal. On the other hand, the hot sprue bushing connector 106 is connected within the junction box 52 to heavier cables 93a (FIG. 8) to an output connector 106 on the junction box 52 for connection to a power source of high voltage and high current to supply sufficient current to the heaters to heat the hot sprue. FIG. 8 is a diagrammatic view of the wiring inside the junction box between the junction box connectors 50 and the common output connector 95 leading to the controller and also between the sprue connector 50 and the sprue square connector 106. Manifestly, where there is a hot runner with heaters, a similar connector (not shown) may be provided on the junction box and heavy cables 93a may be connected to the output side connector for conveying current to these heaters to heat the hot runner to the proper temperature.

Referring now to FIG. 10, there is shown a particular flush-mounted, connector housing 65 for a sprue heater 112 located in a sprue 110 with the heater being shown as a heater coil 112 which is connected to a pair of leads 80n extending from the mold connector 40n. The mold connector housing 65 is flush-mounted with an outer, vertical wall 34 of the mold 14. The mold connector 40n extends inwardly and is buried within the housing 65. Herein, the wires 80n are laid in a narrow slot 115, which is milled in a horizontal, upper wall 121 of the mold and extends from the cavity 67 milled in the mold to the sprue 110. An illustrated and preferred cover for the slot 115 is shown in FIG. 11, which includes an inverted channel-shaped cover body 120 having an upper web 122 which will be slightly recess mounted below the mold wall 121. The plastic housing will have a pair of legs 124, 125 which are sized to be pushed into the slot 115. The length of the plastic channel may be sawed off to the extent needed for such extension from the mold connector housing 65 to the sprue 110. Herein, the housing 65 has an upper, inwardly-extending lip 65a (as best seen in FIG. 10) which overlies the channel web 122. A similar lip 110a is formed on the sprue 110 to overlie the rear end or internal end of the web 122 of the channel-shaped cover 120. Thus, it will be seen that the slot 115 may be covered very easily and quickly with a plastic cover 120 without the use of any threaded fasteners.

When retrofitting an existing mold 145 for use of the color-coded cables 42a–42n and a junction box 140 of the present invention, the mold may be provided with an externally mounted junction box 140 (as best seen in FIGS. 12 and 13) with front wall 150 of the junction box 140 having the mold connectors 40 which are coded for connection to the cable ends 43. The leads or loose wires 80a–80n (FIG. 13) from the mold sensors, switches and sprue may be attached to a back wall 149 of the junction box 140 and internal wires such as wires 93 and 93a (FIG. 8) may run within the hollow interior of the junction box 140 to its outer face wall 150. The mold connectors 40 are flush-mounted or recessed within the vertical face wall 150 of the junction box. The retrofit junction box 140 has a strong housing 141 to protect the coded connectors 40 from the bumps or the wires from being broken or pinched.

It will be appreciated that although various aspects of the invention have been described with respect to specific embodiments, alternatives and modifications will be apparent from the present disclosure, which are within the spirit and scope of the present invention as set forth in the following claims.

What is claimed is:

1. A method of providing electrical connections between a molding press having a mold and a controller for operating the press; said method comprising the steps of:

providing the mold with a plurality of recessed cavities in an outer wall of the mold of a predetermined size and shape;

providing mold connectors having mold bodies which shaped and sized to it into the respective recessed cavities to provide standardized mold connectors for specific mold functions;

providing electrical receptacles having contacts in the respective mold connectors with the mold connectors being coded to a specific function;

providing a junction box with junction box connectors similarly coded as the mold connectors for the same respective functions; and connecting detachable coded cables having coded plugs at each end thereof, each for plugging into a similarly coded mold connector and a junction box connector.

2. A method in accordance with claim 1, including the step of:

providing a mold connector with an enclosed switch therein with a switch actuator projecting outwardly from the mold connector body to be actuated by a movable portion of the mold.

3. A method in accordance with claim 1, including the step of:

mounting the mold connectors with outer walls of the mold connectors substantially within the outer wall of the mold to prevent damage to the mold connectors during transport of the mold.

4. A method in accordance with claim 1 wherein the mold connectors, plugs and junction connectors are color-coded and keyed to prevent wrong connections.

* * * * *